United States Patent
Long et al.

(10) Patent No.: US 7,472,383 B2
(45) Date of Patent: Dec. 30, 2008

(54) SYSTEM AND METHOD FOR PROVIDING EXCEPTIONAL FLOW CONTROL IN PROTECTED CODE THROUGH MEMORY LAYERS

(75) Inventors: Dean R. E. Long, Boulder Creek, CA (US); Nedim Fresko, San Francisco, CA (US); Christopher J. Plummer, San Martin, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 678 days.

(21) Appl. No.: 10/918,130

(22) Filed: Aug. 13, 2004

(65) Prior Publication Data

US 2006/0037003 A1 Feb. 16, 2006

(51) Int. Cl.
*G06F 9/45* (2006.01)
(52) U.S. Cl. .................. 717/158; 717/130; 717/154
(58) Field of Classification Search ............... None
See application file for complete search history.

(56) References Cited

U.S. PATENT DOCUMENTS

| | | | | |
|---|---|---|---|---|
| 6,687,849 | B1 * | 2/2004 | Cherf | 714/5 |
| 6,839,894 | B1 * | 1/2005 | Joshi et al. | 717/130 |
| 7,127,709 | B2 * | 10/2006 | Demsey et al. | 717/148 |
| 2003/0167459 | A1 * | 9/2003 | Bates et al. | 717/125 |
| 2003/0217354 | A1 * | 11/2003 | Bates et al. | 717/129 |
| 2005/0010912 | A1 * | 1/2005 | Adolphson et al. | 717/151 |

OTHER PUBLICATIONS

Cierniak, M., Lueu, Y. and Stichnoth J., Praticing JUDO: Java Under dynamic optimizations, 2000, Proceedings of the ACM SIGPLAN 2000 conference on Progaming language design and implementation, pp. 13-26.*
Buck, B. and Hollingsworh, J.K., AN API for Runtime Code Patching. Technical Report, University of Maryland, College Park, MD. Journal of Supercomputing Aplications, 2000.*
Won So, Dean, A., Procedure cloning and intergration for converting parallelism from coarse to fine grain, Feb. 8, 2003, Interaction Between Compilers and Computer Architectures, 2003, pp. 27-36.*

* cited by examiner

*Primary Examiner*—Tuan Q Dam
*Assistant Examiner*—Cheneca P Smith
(74) *Attorney, Agent, or Firm*—Park, Vaughan & Fleming LLP

(57) ABSTRACT

A system and method for providing exceptional flow control in protected code through memory layers. Code is generated. The generated code includes a sequence of normal operations and is subject to protection against copying during execution of the generated code. The generated code is instantiated as a master process into a master layer in a memory space. The master process is cloned by instantiating a copy of the master process as a child layer in the memory space. Execution points within the generated code are identified. A copy of at least a portion of the generated code containing each execution point as an exception layer is instantiated in the memory space. The generated code in the exception layer is patched at each identified execution point with operations exceptional to the normal operations sequence and which are performed upon a triggering of each execution point during execution of the generated code.

28 Claims, 14 Drawing Sheets

60

80

100

140

170

SYSTEM AND METHOD FOR PROVIDING EXCEPTIONAL FLOW CONTROL IN PROTECTED CODE THROUGH MEMORY LAYERS

FIELD OF THE INVENTION

The invention relates in general to exceptional flow control and, in particular, to a system and method for providing exceptional flow control in protected code through memory layers.

BACKGROUND OF THE INVENTION

Fundamentally, a computer program is a sequence of instructions expressed according to the rules and syntax of a high level programming or assembly language, such as C++ or Java. The program specifies the control flow and logic to be performed at runtime. Prior to execution, the instructions are translated into machine operations by an interpreter or compiler. An interpreter performs a runtime translation of the instructions, which sacrifices speed for convenience and is generally inefficient. However, interpreted code is acceptable for non-critical applications and can be modified on-the-fly without having an appreciable effect on execution speed.

Conversely, compilers generate executable code embodied as an executable module. Compiled or generated code typically executes efficiently, but, once compiled, cannot be changed except through patching, which statically modifies or replaces the generated code. Patching is often performed for code updates to fix program bugs or to provide improve functionality. Patching can also be performed as temporary memory writes to facilitate secondary system activities, such as exceptional flow control, which uses short-lived modifications to the generated code that are removed upon completion of the system activity. Temporary memory writes include setting breakpoints, setting safepoints for rendezvous of threads, selective instrumentation or profiling, and performing garbage collection activities, such as object header marking for liveness checking. Rendezvous points or safe points are set to enable a task that requires all threads to be in a known state to safely execute.

For example, patching generated code is particularly effective at improving the efficiency of garbage collection in memory-constrained embedded systems, where memory fragmentation can be damaging to performance. In garbage collection, precise pointer scanning can be used to allow a virtual machine environment to fully compact a memory heap by tracking memory pointers assigned to dynamically allocated objects. For efficiency, the generated code is kept garbage collection unsafe at runtime. Garbage collection safepoints are defined at particular execution points within the code and memory pointer manipulation is allowed to proceed at runtime without fear of interacting with garbage collection operations. Safepoints avoid the overhead incurred by having to track memory pointers by stopping all execution threads during a rendezvous to allow garbage collection to proceed. Typically, safepoints are defined at method invocations, object allocations, thread synchronization calls, loop iterations, and similar execution points to ensure that all threads can be reached and stopped.

Safepoints are triggered in response to a garbage collection request, which can be detected through polling. However, polling is computationally expensive. For instance, on RISC architectures, polling often requires up to five processor cycles per poll, which creates unacceptably high overhead, particularly where safepoints are set at each loop iteration.

Alternatively, code patching allows garbage collection request monitoring to proceed with no overhead cost. In the absence of a garbage collection request, a table of the locations of the safepoints is maintained for use by a dynamic complier, which patches the generated code at each safepoint at runtime upon receiving a garbage collection request. The patches invoke exception flow control that stops thread execution through, for instance, a function call, code branch, software trap, or instruction that causes a memory fault trap. Generally, a patch causing exceptional flow control modifies only a small section of code to cause execution to be redirected to an exception handler. The exception handler then performs extra operations and removes the patch to enable regular execution to resume once control is returned back from the exception handler.

Patching code, such as used for garbage collection safepoints, can be incompatible with generated non-modifiable code, such as read only code or code embodied in read only memory. Patching code can also be ill-suited to code maintained in a copy protected form that does not readily accommodate patching, such as code found in precompiled and linked methods or speculatively initialized application models. Similarly, process cloning as provided through copy-on-write or deferred copying allows a child process to implicitly share the process memory space, including generated code, of a master parent process, provided that the shared memory space of the child process remains unmodified. Code patching destroys the implicit sharing relationship and can negate memory advantages gained through process cloning.

Therefore, there is a need for an approach to providing temporary writes to generated code without destroying copy protection to enable exceptional flow control. Preferably, such an approach would be performed in separately defined memory layers that non-destructively overlay the original generated code.

SUMMARY OF THE INVENTION

One embodiment provides a system and method for providing exceptional flow control in protected code through memory layers. Code is generated. The generated code includes a sequence of normal operations and is subject to protection against copying during execution of the generated code. The generated code is instantiated as a master process into a master layer in a memory space. The master process is cloned by instantiating a copy of the master process as a child layer in the memory space. Execution points within the generated code are identified. A copy of at least a portion of the generated code containing each execution point is instantiated as an exception layer in the memory space. The generated code in the exception layer is patched at each identified execution point with operations exceptional to the normal operations sequence and which are performed upon a triggering of each execution point during execution of the generated code.

A further embodiment provides a system and method for providing exceptional flow control in protected code through breakpoints with a private memory layer. Code is generated. The generated code includes a sequence of normal operations and is subject to protection against copying during execution of the generated code. Execution points within the generated code are identified. A copy of at least a portion of the generated code containing each execution point is instantiated into a private memory layer. A breakpoint corresponding to each of the execution points is set by modifying the private memory layer by writing a breakpoint patch at the corresponding execution point. A trap handler associated with each breakpoint is defined and includes operations exceptional to the normal operations sequence that are performed upon a triggering of each breakpoint during execution of the generated code.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
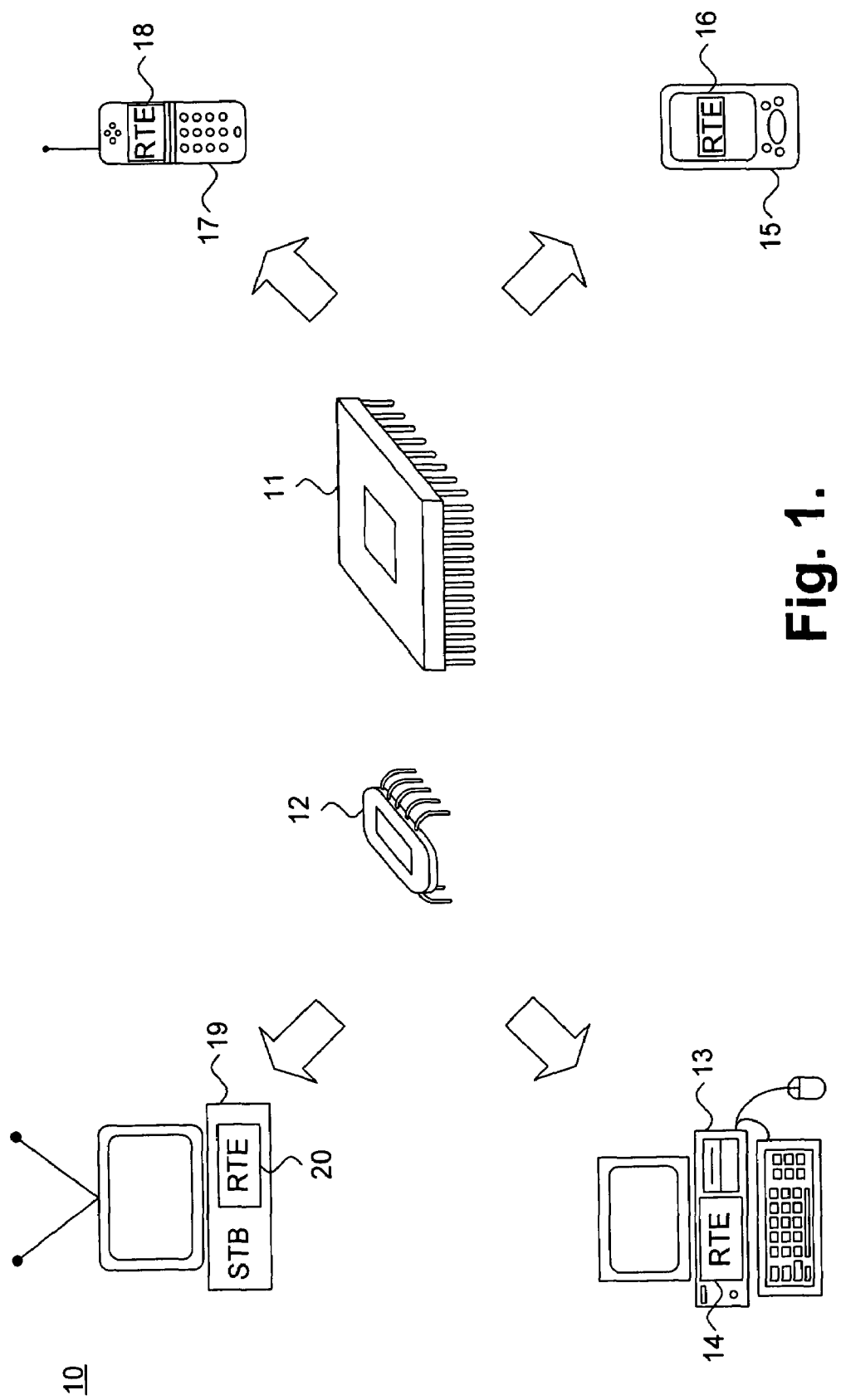
FIG. 1 is a functional block diagram showing, by way of example, runtime environments conventionally implemented on a plurality of programmable devices.

FIG. 1 is a functional block diagram 10 showing, by way of example, runtime environments conventionally implemented on a plurality of programmable devices. The programmable devices include, nonexclusively, computer systems, such as desktop 15 or laptop computer systems, portable computing devices, such as personal data assistants 15, and consumer devices, such as cellular telephones 17 and set top boxes (STB) 19. Other types of programmable devices are possible. Each programmable device includes a microprocessor 11 operating under the control of an operating system and application program instructions embodied in a memory device 12. In addition, each programmable device preferably includes non-volatile storage, such as a hard drive or read-only memory (ROM), for persistently maintaining the operating system and application programs, and volatile storage, in the form of random access memory (RAM), for transiently storing code and statically- and dynamically-allocated data objects, as further described below with reference to FIG. 2. Finally, each programmable device also provides a managed code platform, such as the Java operating environment, executing in a runtime environment (RTE) 14, 16, 18, 20, as further described below with reference to FIG. 3, which enables the programmable device to execute specific types of application programs, generally written in a machine-portable programming language, such as the Java programming language.

In a further embodiment, each operating system supports a process cloning mechanism that spawns multiple and independent isolated user applications by cloning the memory space of specifiable processes, as further described below with reference to FIGS. 4 through 5B. An example of a process cloning mechanism suitable for use in the present invention is the fork( ) system call provided by the Unix or Linux operating systems, such as described in M. J. Bach, "The Design Of The Unix Operating System," Ch. 7, Bell Tele. Labs., Inc. (1986), the disclosure of which is incorporated by reference. The process invoking the fork( ) system call is known as the "parent" or master process and the newly created process is called the "child" process. The operating system assigns a new process identifier to the child process, which executes as a separate process. The operating system also creates a logical copy of the context of the parent process by copying the memory space of the parent process into the memory space of the child process. In a copy-on-write variant of the fork( ) system call, the operating system only copies references to the memory space and defers actually copying individual memory space segments until, and if, the child process attempts to modify the referenced data of the parent process context. The copy-on-write fork( ) system call is faster than the non-copy-on-write fork( ) system call and implicitly shares any data not written into between the parent and child processes.

Executable Process Address Space

Figure 2:
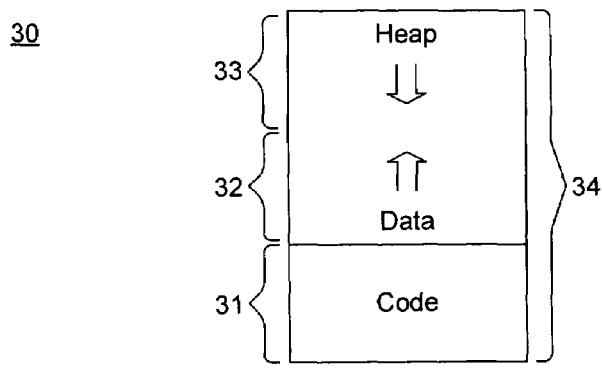
FIG. 2 is a block diagram showing, by way of example, address space for a executable process as provided by a programmable device.

FIG. 2 is a block diagram 30 showing, by way of example, address space for a executable process 66 as provided by a programmable device. The executable process 66 is generated by a compiler or similar pre-execution tool and includes a code segment 31, data segment 32 and heap segment 33. The heap segment 33 could also implement a stack. The code segment 31 contains the program instructions as object code for execution by the microprocessor 11. The code segment 31 has a fixed size. The data segment 32 and heap segment 33 respectively contain statically- and dynamically-allocated objects. Both the data segment 32 and heap segment 33 have variable sizes and grow in opposite directions in terms of memory usage.

As shown, the code segment 31, data segment 32 and heap segment 33 are loaded as generated code into a memory in a single linear address space beginning with the code segment 32 at the lowest memory address. However, in a machine architecture supporting virtual memory paging, the entire address space of the executable process 66 could be paged to memory, thereby resulting in non-contiguous placement of the segments or, where a segment spans multiple pages, parts of segments. Moreover, in memory-constrained programmable devices, the code segment 31 and data segment 32 can be designated as read only or be embodied on a ROM device to avoid having to be read from non-volatile storage into memory prior to execution. Consequently, only objects defined within the heap segment 32 are actively allocated and deallocated at runtime.

Portions of the generated code in the executable process 66, including individual segments, parts of segments, or the entire process, can be subject to protection against copying during execution. Copy protection includes designation as read only or embodiment on a ROM device. Copy protection also includes precompiled and linked methods or speculatively initialized application models, such as respectively described in commonly-assigned U.S. patent application, entitled "System and Method for Providing Precompiled Code through Memory Space Cloning of a Master Runtime System Process," Ser. No. 10/745,020, filed Dec. 22, 2003, pending, and U.S. patent application, entitled "System and Method for Performing Speculative Initialization of Application Models for a Cloned Runtime System Process," Ser. No. 10/745,022, filed Dec. 22, 2003, pending, the disclosures of which are incorporated by reference, or process cloning as provided through copy-on-write or deferred copying, such as described in commonly-assigned U.S. patent application, entitled "System and Method for Dynamic Preloading of Classes through Memory Space Cloning of a Master Runtime System Process," Ser. No. 10/745,023, filed Dec. 22, 2003, pending; U.S. patent application, entitled "System and Method for Performing Incremental Initialization of a Master Runtime System Process," Ser. No. 10/745,164, filed Dec. 22, 2003, pending; and U.S. patent application, entitled "System and Method for Eliminating Static Initialization Overhead by Memory Space Cloning of a Master Runtime System Process," Ser. No. 10/745,021, filed Dec. 22, 2003, pending; the disclosures of which are incorporated by reference. Other types of copy protection over generated code are possible.

Prior Art System for Providing Exceptional Flow Control

Figure 3:
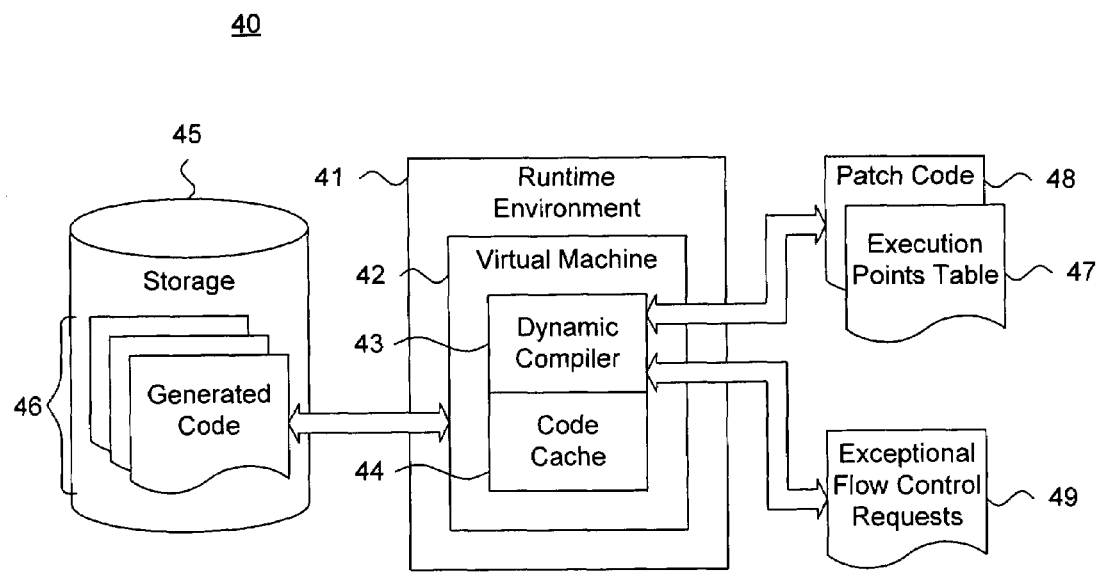
FIG. 3 is a block diagram showing a prior art system for providing exceptional flow control in protected code.

FIG. 3 is a block diagram showing a prior art system 40 for providing exceptional flow control in protected code. By way of example, the system is described with reference to the Java operating environment, although other forms of managed code platforms that execute applications preferably written in an object oriented programming language, such as the Java programming language, could also be used.

The system 40 defines an exemplary runtime environment 41 provided through an operating system and includes a virtual machine (VM) process 42 that executes generated code 46 maintained in non-volatile storage 45. Typically, the generated code 46 remains unchanged in memory and, at runtime, portions of the generated code 46 are progressively staged from memory into a code cache 44 as execution proceeds. However to accommodate requests for exceptional flow control 49, the generated code 46 can be patched by a dynamic compiler 43 to temporarily write modifications or changes, as specified through patch code 48, into the generated code 46 in memory. The patch code 48 is typically a set of function calls to runtime system rendezvous code that stop thread execution by suspending execution or causing the thread to sleep or wait. Exceptional flow control requests 49 include setting breakpoints, setting safepoints for rendezvous of threads, selective instrumentation or profiling, and performing garbage collection activities, such as object header marking for liveness checking. Other types of exceptional flow control requests 49 are possible.

At runtime, the dynamic compiler 43 maintains a table of execution points 47 within the generated code 46 that includes the locations in memory of method invocations, object allocations, thread synchronization calls, loop iterations, and similar execution points to ensure that all threads can be reached and stopped. Other execution points are possible. Upon receiving an exceptional flow control request 49, the dynamic compiler 43 consults the execution points table 47 and patches the generated code 46 in memory with the patch code 48, which provides instructions that stop the corresponding execution thread at a rendezvous point. The thread that requested exceptional flow control waits for the watched execution threads to stop during a rendezvous. Upon completion of the rendezvous, including any secondary work that needs to be done, such as performing a garbage collection, the patch code 48 is removed from the generated code 46 and normal execution by the watched execution threads resumes.

While effective at accommodating exceptional flow control requests 49, the patching of the generated code 46 in memory is either inconsistent or incompatible with copy protected code. Generated code maintained as read only or embodied on a ROM device cannot be patched. And patching generated code for recompiled and linked methods, speculatively initialized application models, or cloned processes, as provided through copy-on-write or deferred copying, can negate significant memory advantages as provided through pre-compilation, initialization and implicit sharing.

Memory Mapping for a Parent Process

In a further embodiment, the runtime environment 41 executes an application framework that spawns multiple independent and isolated user application process instances by preferably cloning the memory space of the virtual machine process 42 as a "parent" or master process to create one or more "child" processes. The example of an application framework suitable for use in the present invention is the Unix operating system, such as described generally in M. J. Bach, supra at Ch. 2, the disclosure of which is incorporated by reference.

Figure 4:
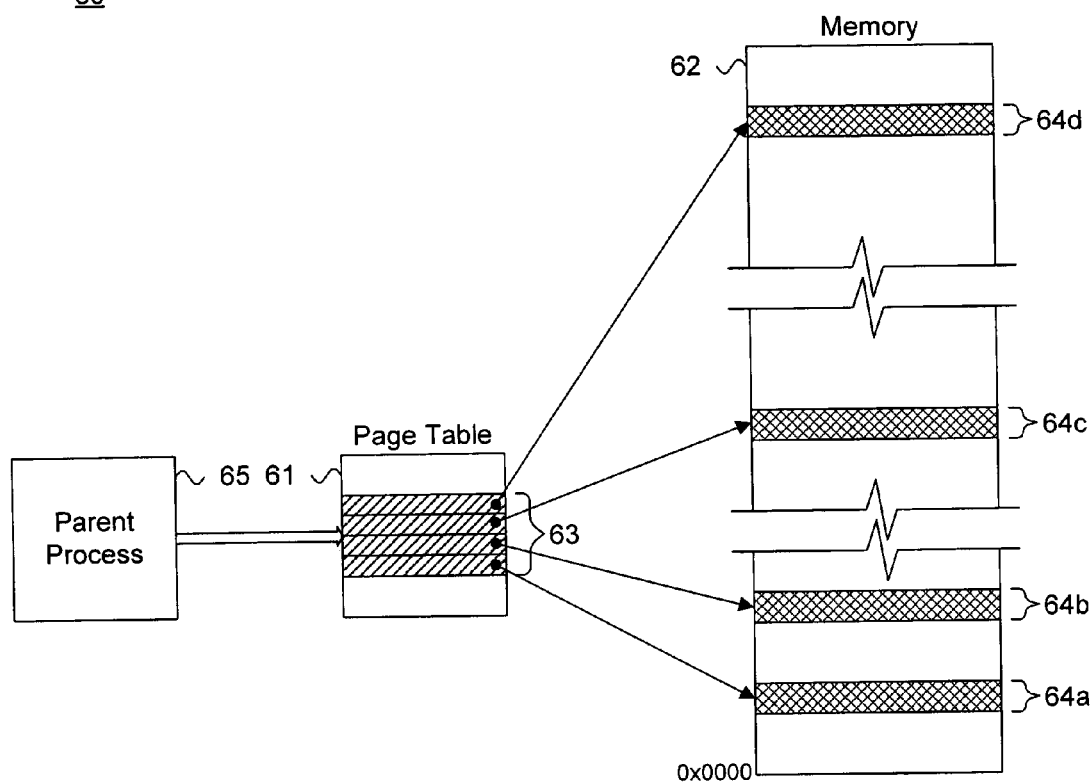
FIG. 4 is a block diagram showing, by way of example, a parent process mapped into memory.

FIG. 4 is a block diagram 60 showing, by way of example, a parent process 65 mapped into memory 62. Generally, the context for an executing process includes a data space, user stack, kernel stack, and a user area that lists open files, current directory and supervisory permission settings. Other types of context can also be provided. The context is stored and managed in the memory 62 by the operating system. At runtime, the operating system instantiates a representation of the executable parent process 65 into the memory 62, possibly in non-contiguous pages 64a-d, and records the allocation of the memory space as page table entries 63 into the page table 61 prior to commencing execution of the parent process 65. As well, the parent process context could similarly be mapped using other memory management systems, such as using demand paging, swapping and similar process memory allocation schemes compatible with process cloning, particularly process cloning with copy-on-write semantics.

Memory Mapping for a Child Process

Figure 5:
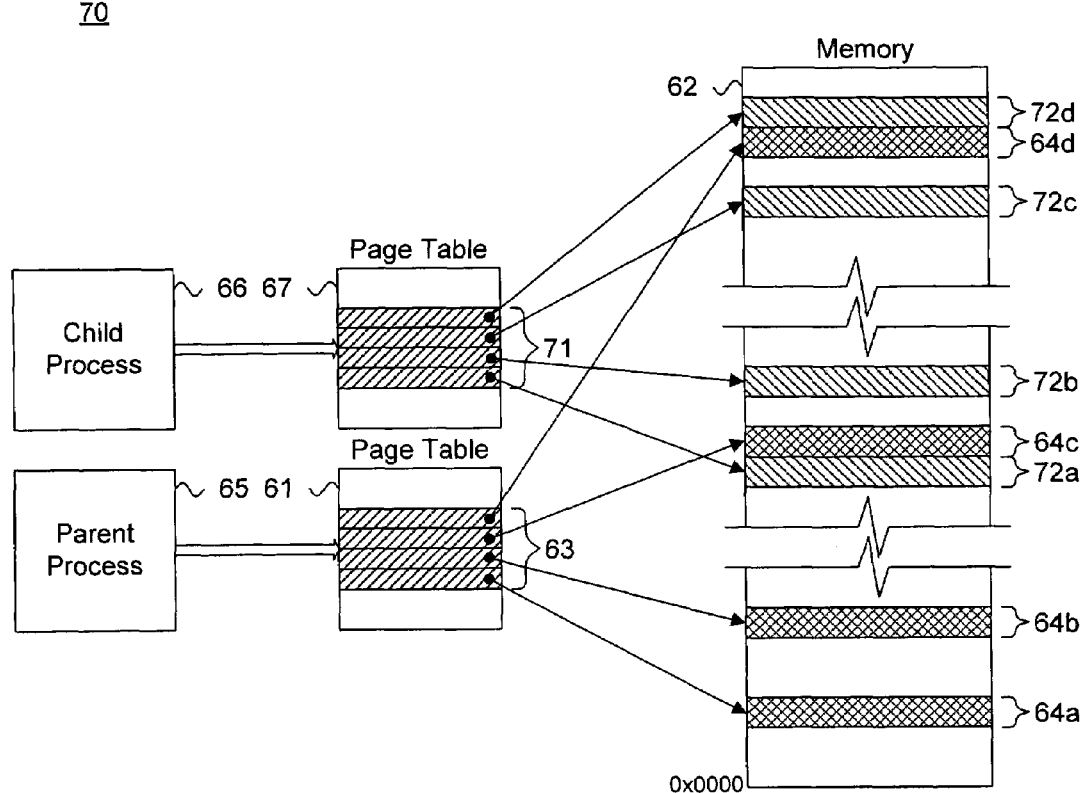
FIG. 5 is a block diagram showing, by way of example, a parent process and a child process mapped into memory through memory space cloning.

FIG. 5 is a block diagram 70 showing, by way of example, a parent process 65 and a child process 66 mapped into memory 62 through memory space cloning. In a system with process cloning that does not provide copy-on-write semantics, physical copies of the pages 64a-c in the memory 62 storing the parent process context are created for each child process. In response to a process cloning request, the operating system instantiates a copy of the representation of the executable parent process 65 for the child process 66 into the memory 62, possibly in non-contiguous pages 72a-d, and records the allocation of the memory space as page table entries 71 into a page table 67 prior to commencing execution of the child process 66. Thus, the child process 66 is created with a physical copy of the context of the parent process 65. Since a new, separate physical copy of the parent process context is created, the child process 66 inherits the prewarmed state 41, including the application-model specific class loader instances 41 and one or more application model-specific code caches 43 from the parent process 65. However, the overall memory footprint of the runtime environment 31 is increased by the memory space required to store the additional copy of the parent process context.

Memory Mapping for a Child Process with Copy-On-Write

Figure 6A:
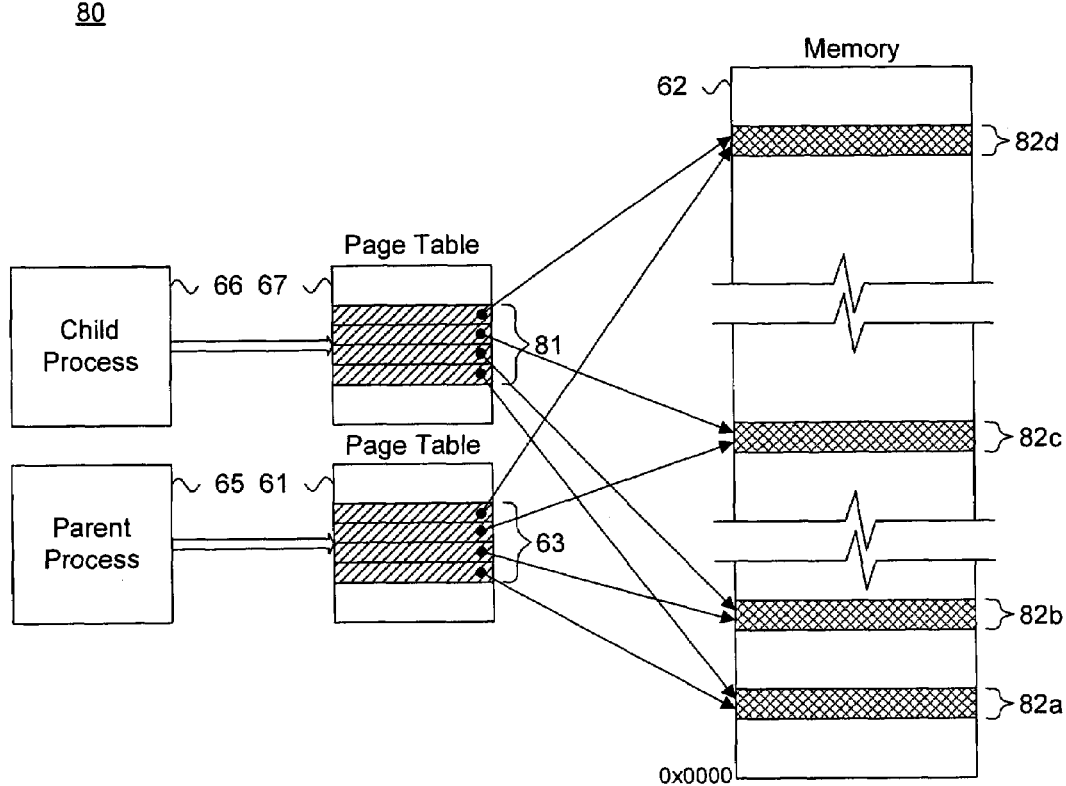
FIGS. 6A-B are block diagrams showing, by way of example, a parent process and a child process mapped into memory through memory space cloning with copy-on-write semantics.
Figure 6B:
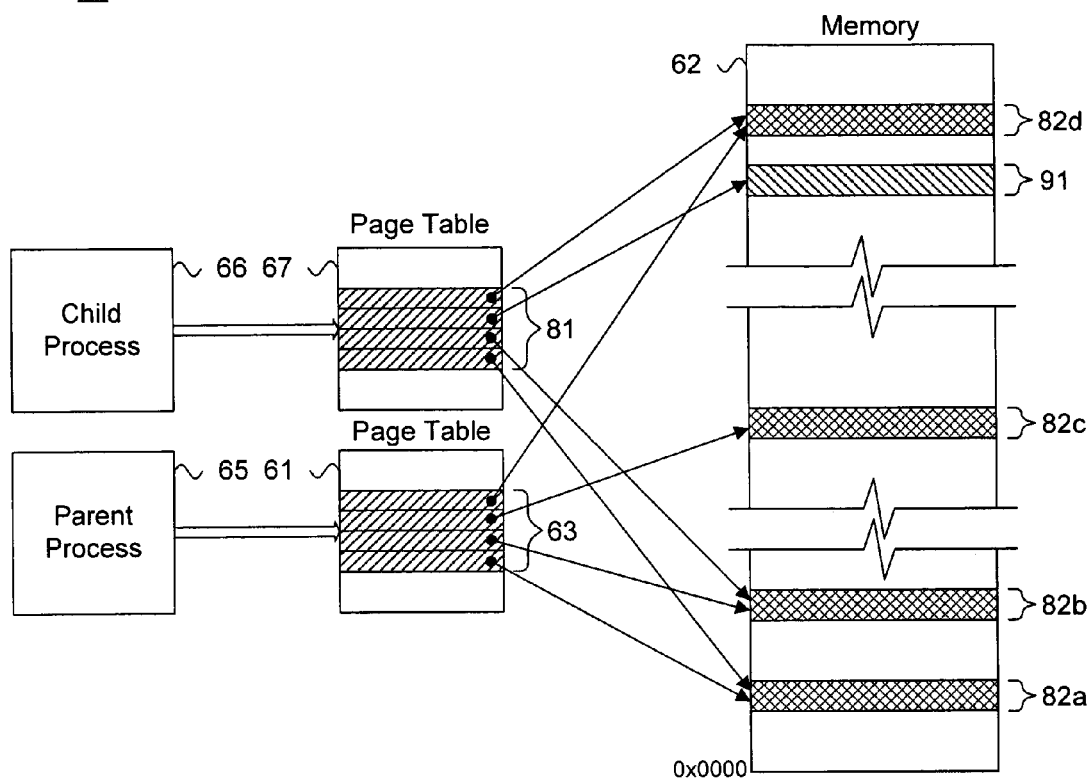

FIGS. 6A-B are block diagrams 80, 90 showing, by way of example, a parent process 65 and a child process 66 mapped into memory 62 through memory space cloning with copy-on-write semantics. In a system with process cloning that provides copy-on-write semantics, only copies of the references, typically page table entries, to the memory space storing the parent process context are created for each child process. Referring first to FIG. 6A, in response to a process cloning request, the operating system copies only the page table entries 63 referencing the memory space of the executable parent process 65 as a new set of page table entries 81 for the child process 66. Thus, the child process 66 uses the same references to the possibly non-contiguous pages 64a-d storing the parent process context as the parent process 66. Initialization and execution of the application associated with the child process 66 requires less time, as only the page table entries 62 are copied to clone the parent process context. Furthermore, until the child process 66 attempts to modify the parent process context, the memory space is treated as read only data, which can be shared by other processes.

Referring next to FIG. 6B, the child process 66 has attempted to modify one of the pages 82c in the memory space of the parent process context, such as through code patching. In response, the operating system creates a physical copy of the to-be-modified memory space page 82c as a new page 91 and updates the allocation in the page table entries 81 for the child process 66. Through copy-on-write semantics, the overall footprint of the runtime environment 31 is maintained as small as possible and only grows until, and if, each child process 66 actually requires additional memory space for application-specific context. Nevertheless, the new page 91 is needlessly created, as code patching for exceptional flow control introduces only temporary modifications or changes to the child process 66, which are removed upon completion of the exceptional flow control.

System for Providing Exceptional Flow Control Through Memory Layers

Figure 7:
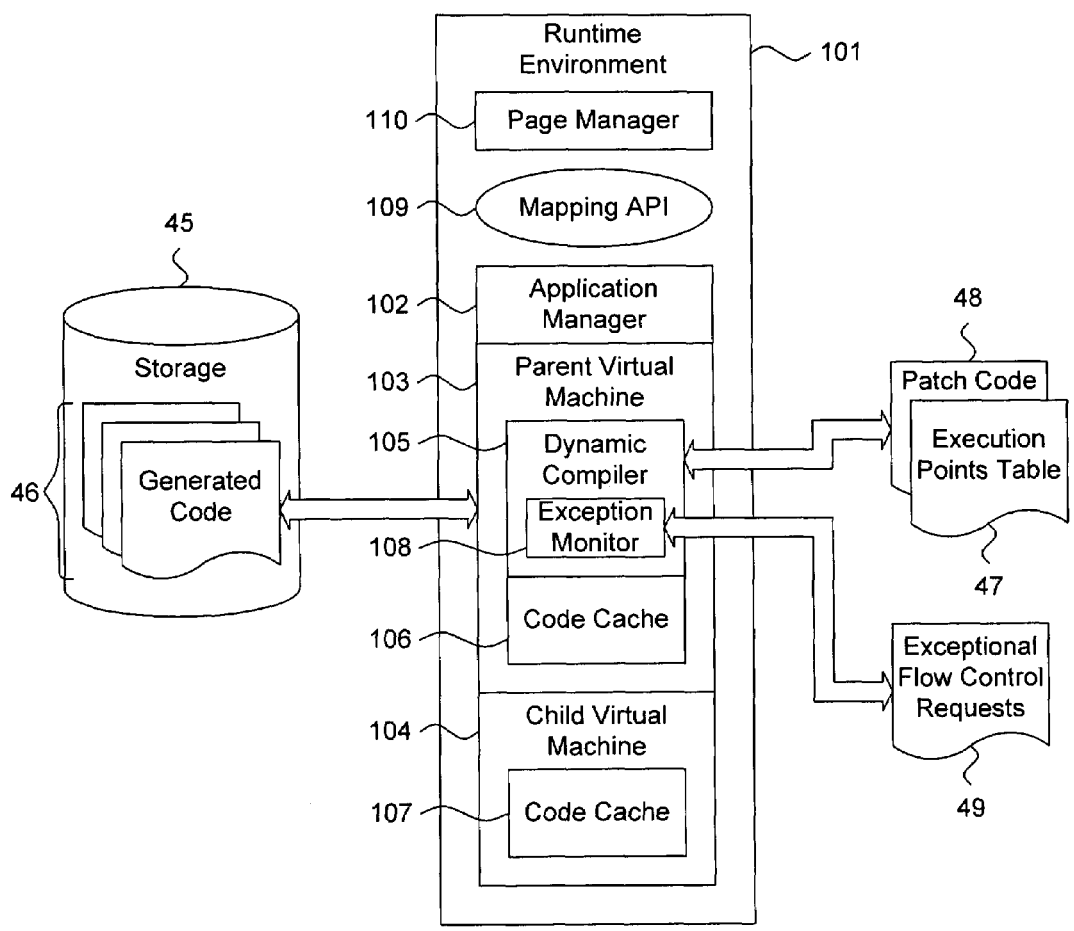
FIG. 7 is a block diagram showing a system for providing exceptional flow control in protected code through memory layers, in accordance with one embodiment.

FIG. 7 is a block diagram showing a system 100 for providing exceptional flow control in protected code through memory layers, in accordance with one embodiment. By way of example, the system is also described with reference to the Java operating environment, although other forms of managed code platforms could also be used.

The system 100 also defines an exemplary runtime environment 101 provided through an operating system and includes an application manager 102, parent virtual machine process 103 and zero or more cloned child virtual machine processes 104. The parent virtual machine process 103 interprets machine-portable code defining compatible applications. The runtime environment 101 need not execute child virtual machine processes 104, which are only invoked upon request by the application manager 102.

The runtime environment 101 executes an application framework that spawns multiple independent and isolated user application process instances by preferably cloning the memory space of a parent virtual machine process. An example of an application framework suitable for use in the present invention is the Unix operating system, such as described generally in M. J. Bach, supra at Ch. 2, the disclosure of which is incorporated by reference.

The application manager 102 presents a user interface through which individual applications can be selected and executed. The application manager 102 and parent virtual machine process 103 preferably communicate via an inter-process communication (IPC) mechanism, such as a pipe or a socket. The parent virtual machine 103 creates a cloned child virtual machine process 104 as a new cloned process instance of the parent virtual machine process 103 using the process cloning mechanism of the underlying operating system. When implemented with copy-on-write semantics, the process cloning creates a logical copy of only the references to the parent virtual machine process context, as further described above with reference to FIGS. 6A-B. Segments of the referenced parent virtual machine process context are lazily copied only upon an attempt by the child virtual machine process to modify the referenced context. Therefore, as long as the child virtual machine process does not write into a memory segment, the segment remains shared between parent and child virtual machine processes.

As before, portions of the generated code 46 are progressively staged from memory into a code cache 106 of the parent virtual machine 106 at runtime as execution proceeds. The code cache 106 is copied as the code cache 107 of the child virtual machine 104 as part of the context of the parent virtual machine 106 at process cloning. At runtime, an exception monitor 109 detects an exceptional control flow request 49 and creates a writeable copy of the code cache 107 of the child virtual machine 104, as further described below with reference to FIGS. 8A-B. In a manner analogous to a stack, the code cache copy logically forms a separate layer that is "pushed" on top of the previous view of memory and which is removed by "popping" or dereferencing the separate layer from the page table.

The request to copy the pages containing the code cache 107 is made through a mapping application programming interface (API) 109 exported by the operating system in the runtime environment 141, which coordinates the page copy request through a page manager 110. In a further embodiment, the mapping API 109 is provided by a library. The exception monitor 109 then patches the execution points identified in the execution point table. Each page that is modified by these patches will exist only in the new memory layer. Due to copy-on-write semantics, the original contents of the page remain unchanged in the original, underlying memory layer. Thus, upon receiving an exceptional flow control request 49, the exception monitor 108 writes patch instructions 48 into the code cache, effectively creating a breakpoint. When an executing thread executes the breakpoint code, an exception handler is called. The state of the executing thread is preserved, such that normal execution of the thread can resume later, as if the breakpoint never happened. The exception handler will cause the executing thread to rendezvous with the thread that issued the exceptional flow control request and the executing thread will then wait until asked to resume normal execution. The thread that requested exceptional flow control waits for the watched execution threads to stop at the rendezvous point. Upon completion of the rendezvous, the page containing the generated code copy is removed or "popped" to reveal the original code cache memory and normal execution by the watched execution threads resumes. In the described embodiment, the API 109 implements a code cache copying interface:

dup_mapping(start_address, end_address)

and code cache copy dereferencing interface:

pop_mapping(start_address, end_address), where start_address specifies a starting address and end_address specifies an ending address. Other interface definitions are possible.

Memory Mapping with Memory Layers

Figure 8A:
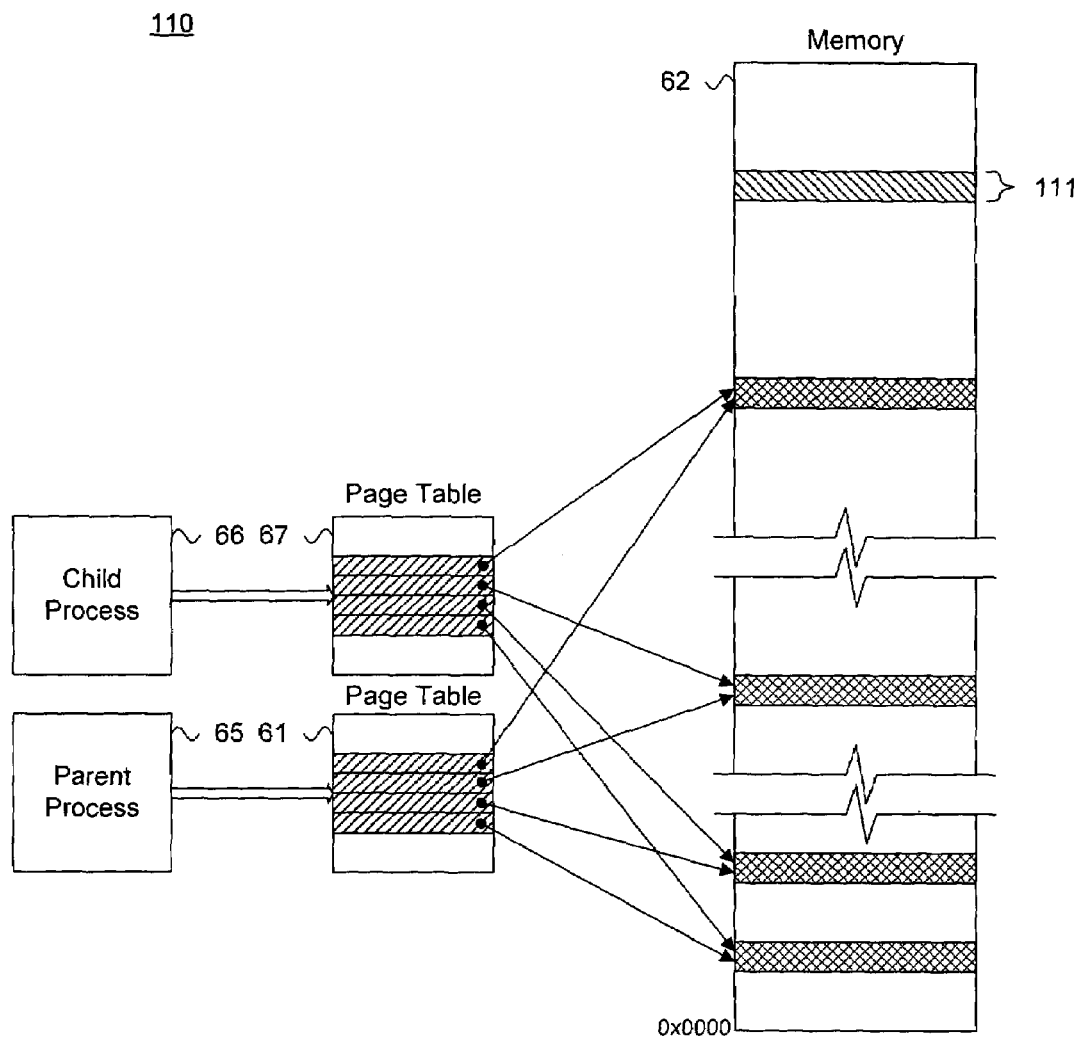
FIGS. 8A-B are block diagrams showing, by way of example, a process mapped into memory with memory layers.
Figure 8B:
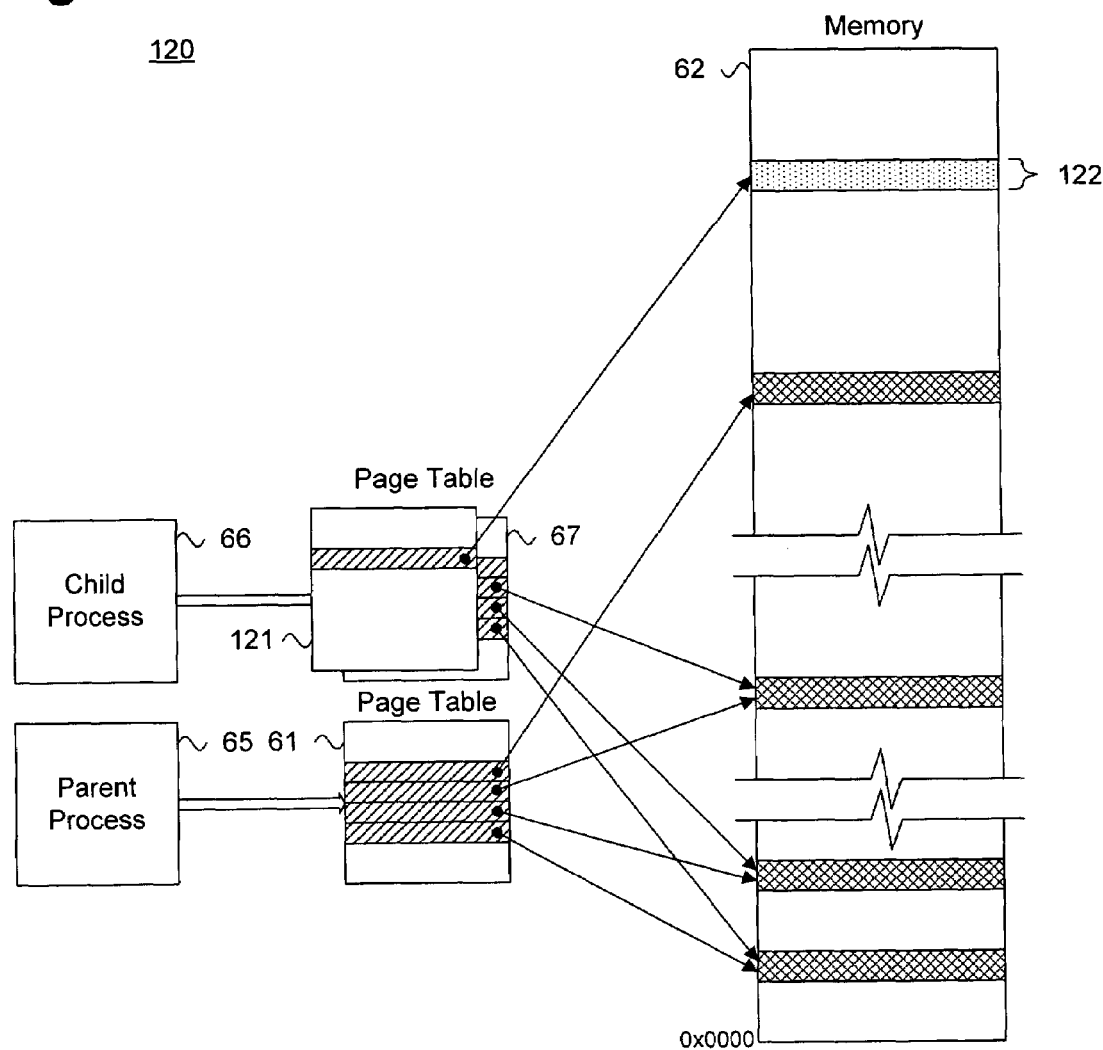

FIGS. 8A-B are block diagrams 110, 120 showing, by way of example, a process mapped into memory with memory layers. Referring first to FIG. 8A, upon detecting an exceptional flow control request 49, the page manager 146 creates a copy 111 in memory 62 of each page of the code cache 107 of the child virtual machine 104. Referring next to FIG. 8B, the execution points within the code cache copy 122 are patched with patch code 48 to stop thread execution at the rendezvous and are referenced as a new memory layer by "pushing" the address of the code cache copy 122 onto a page table 121. Upon completion of the exceptional flow control, the cache code copy 122 in memory 62 is dereferenced by "popping" the address of the code cache copy 122 from the page table 121, which effectively restores the original page table 67. Normal execution then resumes.

Method for Providing Exceptional Flow Control Through Memory Layers

Figure 9:
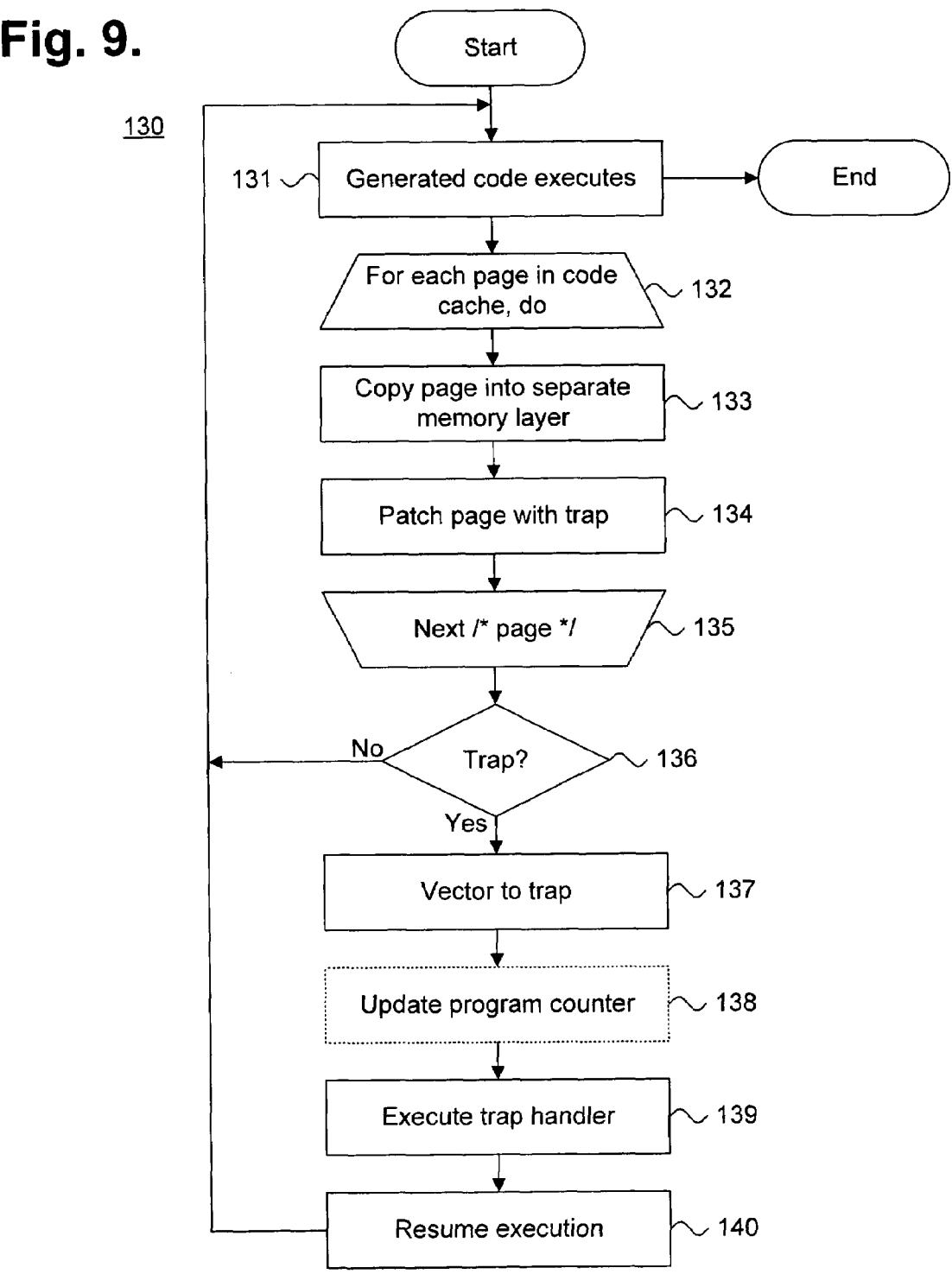
FIG. 9 is a flow diagram showing a method for providing exceptional flow control in protected code through memory layers, in accordance with one embodiment.

FIG. 9 is a flow diagram 130 showing a method for providing exceptional flow control in protected code through memory layers, in accordance with one embodiment. The method 130 is described as a sequence of process operations or steps, which can be executed, for instance, by the runtime environment 101 of FIG. 7 or other components.

Initially, the generated code 46 executes (block 131). In response to an exceptional flow control request 49, the code cache 107 of the child virtual machine 104 is copied. For each page of the code cache 107 (blocks 132-135), the page 121 is copied into a separate layer in the memory 62 (block 133) and patched with patch code 48 (block 134). Upon triggering of a trap corresponding to the patch code 48 (block 136), a trap is vectored (block 137) to trigger the execution of the patch code 48 (block 139), after which the cache code copy is dereferenced and execution of the generated code 46 resumes (block 140). The method terminates upon completion of the generated code 46. In a further embodiment, the program counter of the child virtual machine 104 is adjusted to cause execution to begin in the new address range upon trapping in response to an exceptional flow control request 49 (block 138).

System for Providing Exceptional Flow Control Through Breakpoints

Figure 10:
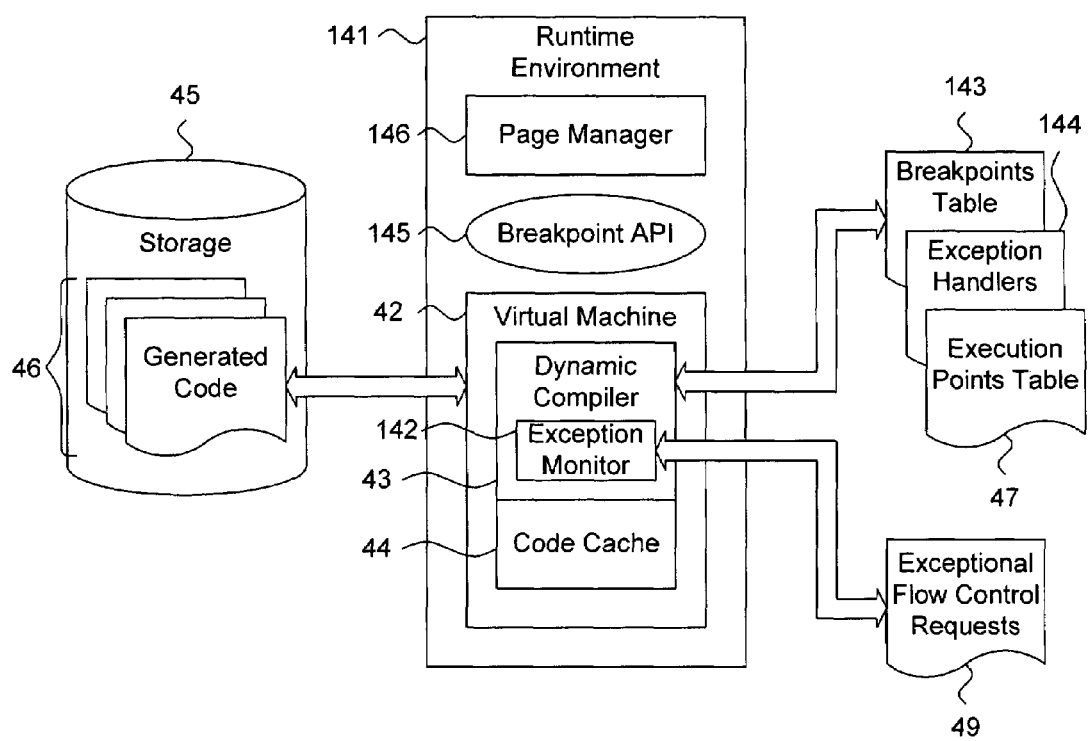
FIG. 10 is a block diagram showing a system for providing exceptional flow control in protected code through breakpoints with a private memory layer, in accordance with a further embodiment.

FIG. 10 is a block diagram showing a system 140 for providing exceptional flow control in protected code through breakpoints with a private memory layer, in accordance with a further embodiment. By way of example, the system is also described with reference to the Java operating environment, although other forms of managed code platforms could also be used.

The system 140 also defines an exemplary runtime environment 141 provided through an operating system and includes the virtual machine (VM) process 42 that executes the generated code 46 maintained in the non-volatile storage 45. Unlike code patching, which is performed by the application, the generated code 46 is patched with breakpoints that are recorded in a breakpoint table 143 through a breakpoint facility implemented by the operating system or a breakpoint library. As before, portions of the generated code 46 are progressively staged from memory into a code cache 44 at runtime as execution proceeds. At runtime, an exception monitor 142 running within the dynamic compiler 43 detects an exceptional control flow request 49 and creates a writeable copy of each page containing a breakpoint listed in the breakpoints table 144. The set of pages containing copies of those portions of the generated code 46 containing a breakpoint form a private memory layer, as further described below with reference to FIGS. 11A-C.

The request to copy the page is made through a breakpoint application programming interface (API) 145 exported by the operating system in the runtime environment 141, which coordinates the page copy request through a page manager 146. The dynamic compiler then patches the page containing the generated code copy with a trap to a trap handler 144. In the described embodiment, the API 145 implements a page copy request interface:

shared_fork_with_cow(start_address, end_address)

Thus, upon receiving an exceptional flow control request 49, the exception monitor 142 sets the breakpoints listed in the breakpoints table 143 and, once trapped at the set breakpoints, the trap handlers 144 stop thread execution at the rendezvous. The thread that requested exceptional flow control waits for the watched execution threads to stop during a rendezvous. Upon completion of the rendezvous, the page containing the generated code copy is dereferenced and normal execution by the watched execution threads resumes.

Memory Mapping with Breakpoints Set

Figure 11A:
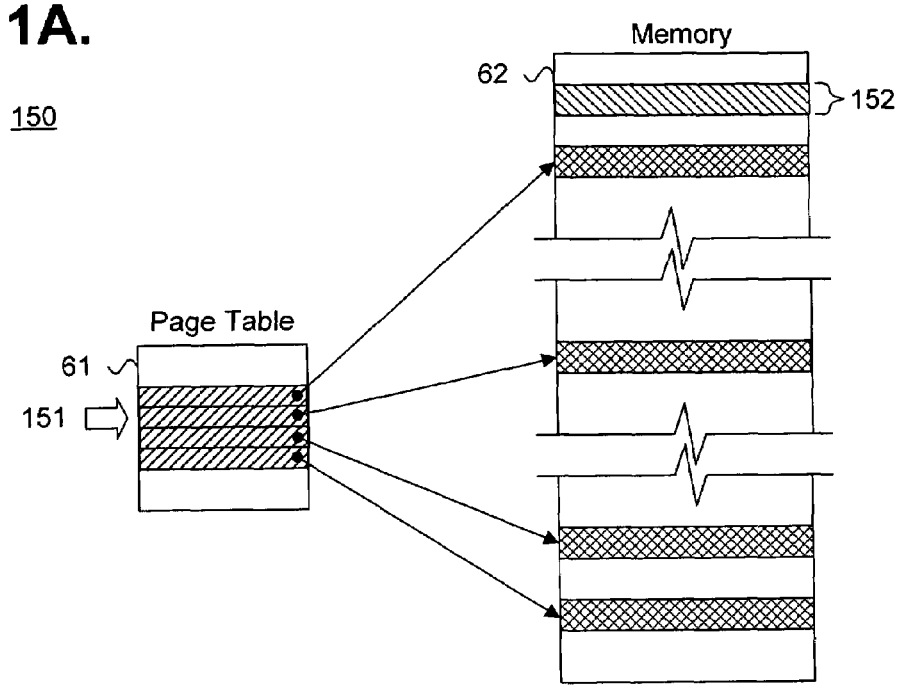
FIGS. 11A-C are block diagrams showing, by way of example, a process mapped into memory with breakpoints set.
Figure 11B:
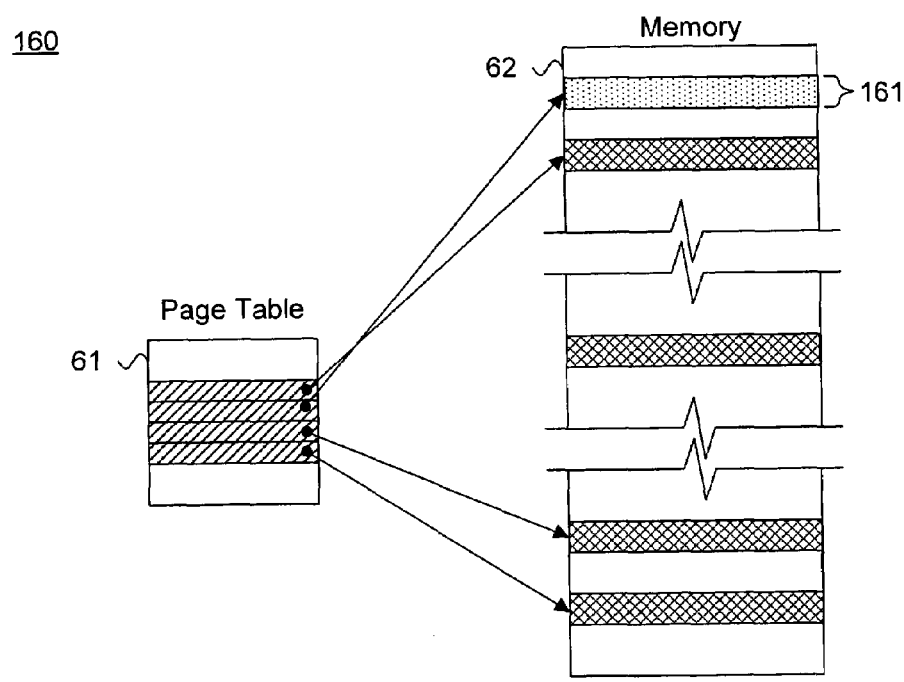
Figure 11C:
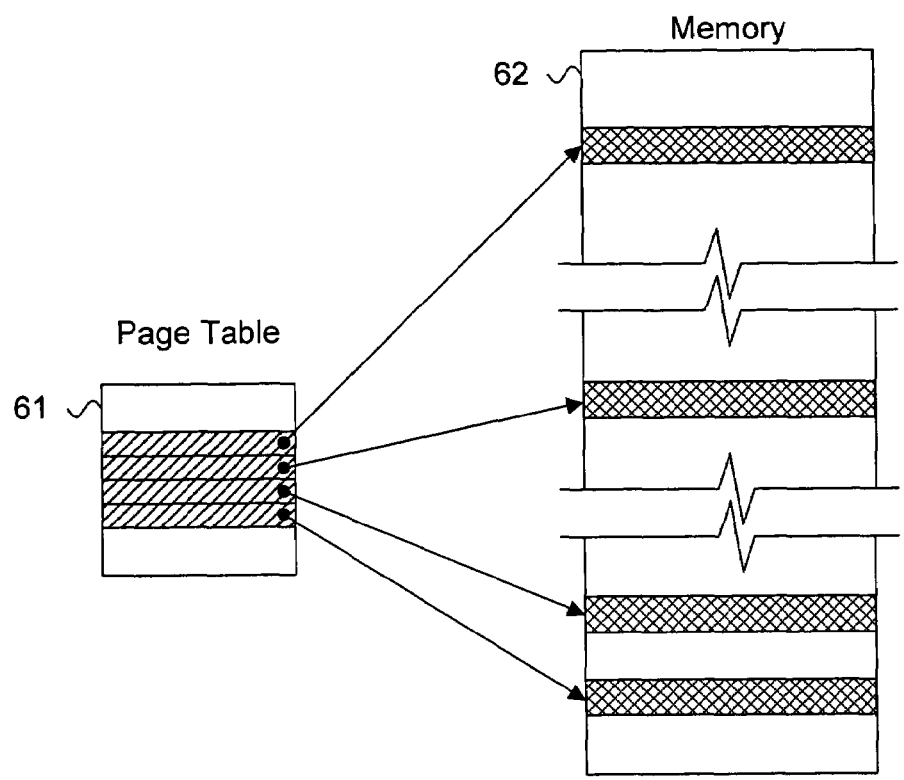

FIGS. 11A-C are block diagrams 150, 160, 170 showing, by way of example, a process mapped into memory with breakpoints set. Referring first to FIG. 11A, a breakpoint 151 is set in the generated code 46 at an execution point identified in the execution point table 47. The breakpoint 151 is assumed to adopt semantics compatible with copy-on-write or deferred copying, that is, setting and clearing of the breakpoint 151 does not destructively change the generated code 46. Upon detecting an exceptional flow control request 49, the page manager 146 creates or "pushes" a copy 152 in memory of the page of generated code 46 containing the breakpoint. Only those pages 152 modified with a breakpoint are copied. In addition, the pages 152 are copied with copy-on-write semantics, such that any of the pages 152 not written into by a breakpoint or patch remain shared with the original page table 67. Referring next to FIG. 11B, the code containing the generated copy is patched with a trap handler 161 to stop thread execution at the rendezvous. Referring finally to FIG. 11C, upon completion of the rendezvous, the copy in memory 62 of the page is removed or "popped," the breakpoint are cleared and normal execution resumes.

Method for Providing Exceptional Flow Control Through Breakpoints

Figure 12:
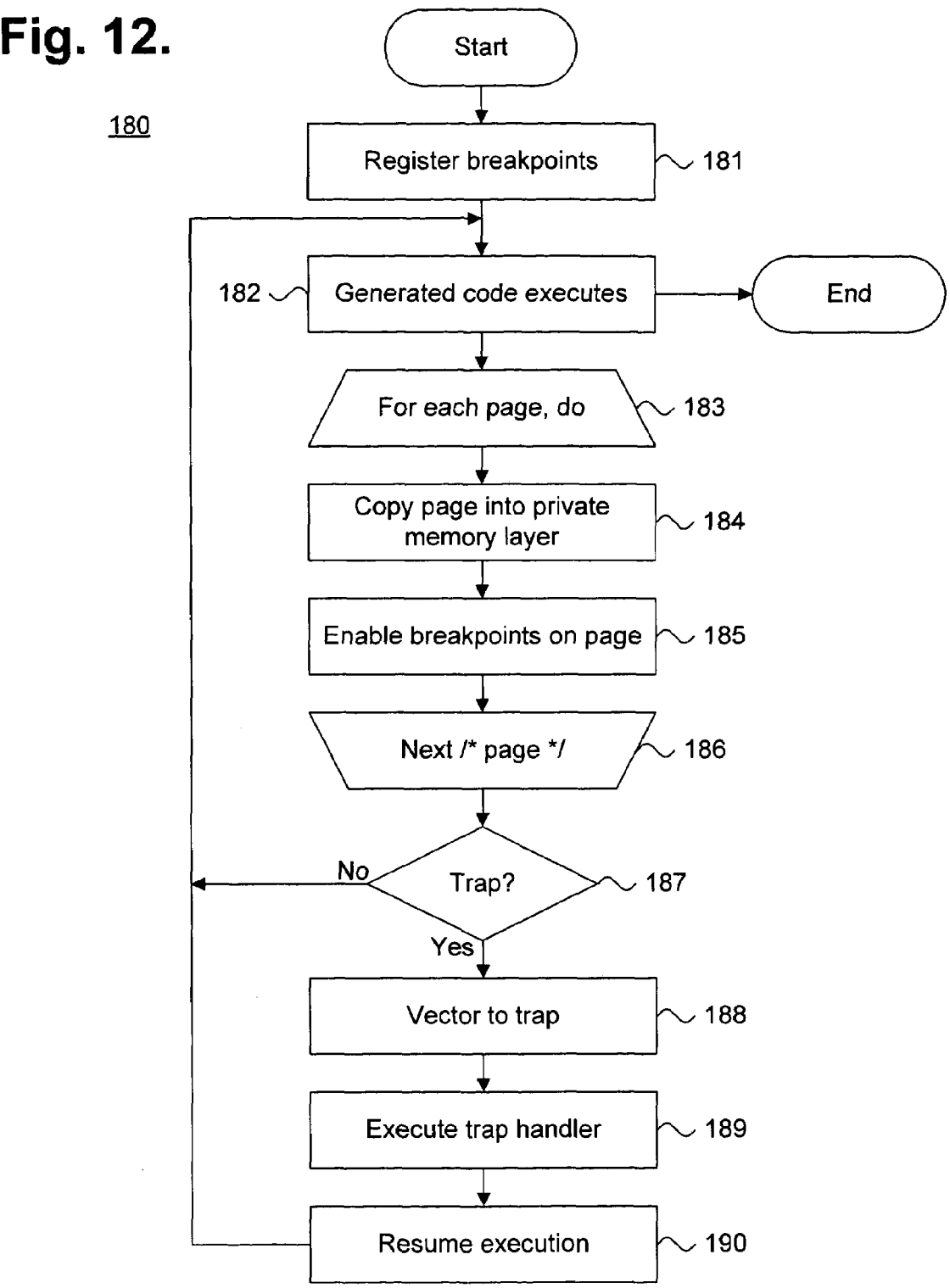
FIG. 12 is a flow diagram showing a method for providing exceptional flow control in protected code through breakpoints with a private memory layer, in accordance with a further embodiment.

FIG. 12 is a flow diagram showing a method 180 for providing exceptional flow control in protected code through breakpoints with a private memory layer, in accordance with a further embodiment. The method 100 is described as a sequence of process operations or steps, which can be executed, for instance, by the runtime environment 141 of FIG. 10 or other components.

Initially, one or more breakpoints 151 are registered in the generated code 46 (block 181). The generated code 46 executes (block 182). For each page containing generated code containing a breakpoint 151 (blocks 183-186), the page 152 is copied into a private layer in the memory 62 (block 184). Only those pages 152 modified with a breakpoint are copied. In addition, the pages 152 are copied with copy-on-write semantics, such that any of the pages 152 not written into by a breakpoint or patch remain shared with the original page table 67. The breakpoints 151 on the page 152 are enabled (block 185). Upon triggering of the breakpoint (block 187), a trap is vectored (block 188) to trigger the execution of a trap handler 144 (block 189), after which the breakpoint is cleared and execution of the generated code 46 resumes (block 190). The method terminates upon completion of the generated code 46.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing exceptional flow control in protected code through memory layers, comprising:
    a processor; and
    a memory coupled with the processor, wherein the memory stores instructions for:
        a compiler to generate code comprising a sequence of normal operations and subject to a type of protection against copying during execution of the generated code;
        a runtime environment to instantiate the generated code as a master process into a master layer in a memory space and to clone the master process by a copy of the master process instantiated as a child layer in the memory space;
        a code analyzer to identify execution points within the generated code on the child layer; and
        a runtime monitor to instantiate a copy of at least a portion of the generated code containing each execution point as an exception layer in the memory space, wherein the runtime monitor defers instantiation until an exception event occurs, and wherein the exception layer is temporarily created by temporarily replacing one or more page table entries, and to patch the generated code in the exception layer at each identified execution point with operations exceptional to the normal operations sequence and which are performed upon a triggering of each execution point during execution of the generated code;
    wherein the runtime environment executes the patched generated code, removes the executed portion of the patched generated code in the exception layer containing the execution point, then resumes the execution of the generated code on the child layer.

2. A system according to claim 1, wherein the exceptional event comprises a global garbage collection request.

3. A system according to claim 1, further comprising:
    an application programming interface to accept parameters specifying a starting location and an ending location of the portion of the generated code.

4. A system according to claim 1, wherein the exception layer comprises a set of memory addresses separate from the memory addresses of the child layer.

5. system according to claim 4, further comprising: a trap handler triggered by execution of the child process subsequent to copying to the child layer.

6. A system according to claim 4, wherein copying of the generated code into the exception layer is deferred until an occurrence of an exceptional event.

7. A system according to claim 1, wherein each execution point comprises at least one of a breakpoint, rendezvous, instrumentation point, profiling point, and garbage collection point.

8. A system according to claim 7, wherein the exceptional operations comprise performing garbage collection.

9. A system according to claim 7, wherein the type of protection is a read-only protection.

10. A method for providing exceptional flow control in protected code through memory layers, comprising:
    generating code comprising a sequence of normal operations and subject to a type of protection against copying during execution of the generated code;
    instantiating the generated code as a master process into a master layer in a memory space and cloning the master process by instantiating a copy of the master process as a child layer in the memory space;
    identifying execution points within the generated code on the child layer and instantiating a copy of at least a portion of the generated code containing each execution point as an exception layer in the memory space, wherein the instantiation is deferred until an exception event occurs, and wherein the exception layer is temporarily created by temporarily replacing one or more page table entries;
    patching the generated code in the exception layer at each identified execution point with operations exceptional to the normal operations sequence and which are performed upon a triggering of each execution point during execution of the generated code;
    executing the patched generated code; removing the executed portion of the generated code in the exception layer containing the execution point; then resuming the execution of the generated code on the child layer.

11. A method according to claim 10, wherein the exceptional event comprises a global garbage collection request.

12. A method according to claim 10, further comprising:
    exporting an application programming interface accepting parameters specifying a staffing location and an ending location of the portion of the generated code.

13. A method according to claim 10, wherein the exception layer comprises a set of memory addresses separate from the memory addresses of the child layer.

14. A method according to claim 13, further comprising:
    defining a trap handler triggered by execution of the child process subsequent to copying to the child layer.

15. A method according to claim 13, further comprising:
    deferring copying of the generated code into the exception layer until an occurrence of an exceptional event.

16. A method according to claim 10, wherein each execution point comprises at least one of a breakpoint, rendezvous, instrumentation point, profiling point, and garbage collection point.

17. A method according to claim 16, wherein the exceptional operations comprise performing garbage collection.

18. A method according to claim 17, wherein the type of protection is a read-only protection.

19. A computer-readable storage medium holding code for performing the method according to claim 10.

20. An apparatus for providing exceptional flow control in protected code through memory layers, comprising:
    a means for processing instructions; and
    a means for storing instructions which is coupled with the means for processing instructions, wherein the means for storing instructions stores instructions for:

generating code comprising a sequence of normal operations and subject to protection against copying during execution of the generated code;
instantiating the generated code as a master process into a master layer in a memory space and cloning the master process by instantiating a copy of the master process as a child layer in the memory space;
identifying execution points within the generated code on the child layer and instantiating a copy of at least a portion of the generated code containing each execution point as an exception layer in the memory space, wherein the instantiation is deferred until an exception event occurs, and wherein the exception layer is temporarily created by temporarily replacing one or more page table entries;
patching the generated code in the exception layer at each identified execution point with operations exceptional to the normal operations sequence and which are performed upon a triggering of each execution point during execution of the generated code;
executing the patched generated code;
removing the executed portion of the generated code in the exception layer containing the execution point; then
resuming the execution of the generated code on the child layer.

21. A system for providing exceptional flow control in protected code through breakpoints with a private memory layer, comprising:
a processor; and
a memory coupled with the processor, wherein the memory stores instructions for:
a compiler to generate code comprising a sequence of normal operations and subject to protection against copying during execution of the generated code;
a code analyzer to identify execution points within the generated code;
an exception monitor to instantiate a copy of at least a portion of the generated code containing each execution point into a private memory layer, to set a breakpoint corresponding to each of the execution points by modifying the private memory layer by writing a breakpoint patch at the corresponding execution point, wherein the exception monitor defers instantiation until an exception event occurs, and wherein the private memory layer is temporarily created by temporarily replacing one or more page table entries;
a trap handler associated with each breakpoint and comprising operations exceptional to the normal operations sequence that are performed upon a triggering of each breakpoint during execution of the generated code; and
a runtime environment to execute the trap handler, to disable each breakpoint, to remove the portion of the generated code in the private memory layer containing the execution point corresponding to the disabled breakpoint, then to resume the execution of the generated code.

22. A system according to claim 21, further comprising:
a list of the execution points, wherein the watchpoint corresponding to each listed execution point are set in response to an exceptional event.

23. A system according to claim 22, wherein the exceptional event comprises a global garbage collection request.

24. A method for providing exceptional flow control in protected code through breakpoints with a private memory layer, comprising:

generating code comprising a sequence of normal operations and subject to protection against copying during execution of the generated code;
identifying execution points within the generated code and instantiating a copy of at least a portion of the generated code containing each execution point into a private memory layer, wherein the instantiation is deferred until an exception event occurs, and wherein the private memory layer is temporarily created by temporarily replacing one or more page table entries;
setting a breakpoint corresponding to each of the execution points by modifying the private memory layer by writing a breakpoint patch at the corresponding execution point;
defining a trap handler associated with each breakpoint and comprising operations exceptional to the normal operations sequence that are performed upon a triggering of each breakpoint during execution of the generated code;
executing the trap handler;
disabling each breakpoint;
removing the portion of the generated code in the private memory layer containing the execution point corresponding to the disabled breakpoint; then
resuming the execution of the generated code.

25. A method according to claim 24, further comprising:
maintaining a list of the execution points; and
setting the breakpoint corresponding to each listed execution point in response to an exceptional event.

26. A method according to claim 25, wherein the exceptional event comprises a global garbage collection request.

27. A computer-readable storage medium holding code for performing the method according to claim 24.

28. An apparatus for providing exceptional flow control in protected code through breakpoints with a private memory layer, comprising:
a means for processing instructions; and
a means for storing instructions which is coupled with the means for processing instructions, wherein the means for storing instructions stores instructions for:
generating code comprising a sequence of normal operations and subject to protection against copying during execution of the generated code;
identifying execution points within the generated code and instantiating a copy of at least a portion of the generated code containing each execution point into a private memory layer, wherein the instantiation is deferred until an exception event occurs, and wherein the private memory layer is temporarily created by temporarily replacing one or more page table entries;
setting a breakpoint corresponding to each of the execution points by modifying the private memory layer by writing a breakpoint patch at the corresponding execution point;
defining a trap handler associated with each breakpoint and comprising operations exceptional to the normal operations sequence that are performed upon a triggering of each breakpoint during execution of the generated code;
executing the trap handler;
disabling each breakpoint;
removing the portion of the generated code in the private memory layer containing the execution point corresponding to the disabled breakpoint; then
resuming the execution of the generated code.

* * * * *

UNITED STATES PATENT AND TRADEMARK OFFICE
CERTIFICATE OF CORRECTION

PATENT NO.         : 7,472,383 B2                                            Page 1 of 1
APPLICATION NO.    : 10/918130
DATED              : December 30, 2008
INVENTOR(S)        : Dean R. E. Long et al.

It is certified that error appears in the above-identified patent and that said Letters Patent is hereby corrected as shown below:

In claim 12 (at column 12, line 40), please change the word "staffing" to the word --starting--.

Signed and Sealed this

Seventeenth Day of February, 2009

JOHN DOLL
*Acting Director of the United States Patent and Trademark Office*